United States Patent [19]

Baartmans

[11] Patent Number: 4,584,219

[45] Date of Patent: Apr. 22, 1986

[54] WEB OF LABELS

[76] Inventor: Hans R. Baartmans, Heikampstraat 37, Essen, Belgium

[21] Appl. No.: 669,828

[22] Filed: Nov. 9, 1984

[51] Int. Cl.[4] .......................... B32B 7/06; B32B 7/12

[52] U.S. Cl. .......................................... 428/42; 428/40; 428/43; 428/78; 428/906; 40/2 R; 206/390

[58] Field of Search ...................... 428/40, 41, 42, 43, 428/78, 906; 40/2 R; 206/390

[56] References Cited

U.S. PATENT DOCUMENTS

| | | | |
|---|---|---|---|
| 3,166,186 | 1/1965 | Karn | 206/56 |
| 3,924,744 | 12/1975 | Heimann | 206/460 |
| 4,032,679 | 6/1977 | Aoyagi | 428/42 |
| 4,188,250 | 2/1980 | Grass | 156/253 |

*Primary Examiner*—Alexander S. Thomas

*Attorney, Agent, or Firm*—Olson and Olson

[57] ABSTRACT

Web of labels consisting of a web of carrier material (1) with self-adhesive labels spaced apart thereon, each of which is cut out by a peripheral cut from a web of label material (2) adhering (3) to the web of carrier material (1), said peripheral cut consisting of two different parts, one of which extends only through the label material (2) and the other through the label material (2) and carrier material (1), whereby an intermediate cut (f) extending to the divisions between the two parts of the peripheral cut extends only through the carrier material (1), and another intermediate cut (d) parallel thereto extends only through the label material (2), in such a manner that two connected label parts are formed, while the distance between the intermediate cuts (f,d) amounts to a few millimeters.

4 Claims, 3 Drawing Figures

II
1
2
2a
2b
4
c
b1
b2
a1
a2
f
d
e
3
5
6

WEB OF LABELS

The invention relates to a web of labels consisting of a web of carrier material with self-adhesive labels spaced apart thereon, each of which is cut out by a peripheral cut from a web of label material adhering to the web of carrier material.

A web of labels of this kind is widely known in practice and is generally supplied in the form of a roll to a labelling machine in which all kinds of containers, such as bottles, tubes and ampoules, are provided with labels. The printed label, which is coated with an adhesive, can easily be removed by machine or by hand from the web of carrier material, which is usually paper coated with silicone or the like, and be transferred to the container. Pressure or the like causes the coating of adhesive on the label to adhere to the container. It is difficult or impossible to remove a label of this kind from the container, and it is precisely intended that this should be so.

Labelled containers of this kind are widely used in hospitals, laboratories and the like, for example in the form of infusion bottles, test tubes and ampoules, in which additives for the infusion liquid or injection agents are contained. These ampoules are small in circumference, so that there is little space for the labels which are to be applied to them.

In hospitals and the like it is now increasingly usual for a part of the label on the container to be subsequently removed and affixed to a patient's card or the like.

In this way it is known precisely which infusion liquids and what other substances have been administered to the patient.

With regard to the printed text, the label then consists of a larger part and a smaller part, with the necessary data shown on both parts. The two parts are sometimes separated from each other by a perforation line.

Despite the perforation line, it is very difficult to peel the smaller part of the label off a bottle or ampoule, because the label adheres very firmly to the bottle or ampoule.

The transfer in this way of the necessary data to the patient's card or the like is thus very time-consuming and laborious, so that the data are usually simply copied by hand, thus entailing the risk of mistakes.

The invention seeks to solve this problem. According to the invention the web of labels is characterised in that the peripheral cut consists of two different parts, one extending only through the label material and the other through the label and carrier material, that an intermediate cut extending to the divisions between the two parts of the peripheral cut extends only through the carrier material, and that another intermediate cut parallel thereto extends only through the label material, in such a manner that two connected label parts are formed, while the distance between the intermediate cuts amounts to a few millimeters.

When a label is removed from a web of labels of this kind, one part of the label, generally the larger part, has its coating of adhesive exposed, but the coating of adhesive on the other part of the label is still covered by a part of the carrier material.

When the label is affixed to a container, only the larger part will therefore adhere, and the smaller part will form a kind of projecting lip which, because of the intermediate cut through the label material, can easily be removed from the larger part. After removal of the piece of carrier material lying on it, this smaller part can be affixed to the patient's card or the like.

In order to prevent the two parts of the label from becoming accidentally detached from one another, the intermediate cut through the label material must be made in such a manner that the parts of the label are still attached to one another. This intermediate cut can therefore be made in the form of a line of perforations, or this intermediate cut may in a preferred embodiment terminate, at both ends, short of the peripheral cut. Label material is therefore still left there and can easily be torn through.

In order to enable the piece of carrier material to be easily removed from the smaller part of the label, the intermediate cuts lie near one another, at a distance of a few millimeters, preferably about 1.5 mm, apart. The two label parts are therefore at first additionally joined to one another along a narrow strip of adhesive.

Although mention was made above of a larger and a smaller part of the label, the differences in size may be greater or smaller, but in the extreme case the parts may also be equal in size. A difference in shape is also possible.

In the web of labels according to the invention at each label a window of the size of the smaller label part is thus cut in the carrier material.

This window weakens the carrier material, as the the result of which a break may occur in the web during machine labelling, which is of course undesirable.

It is therefore preferable to reinforce the web of carrier material by disposing an adhesive laminate, such as a band or the like, against the lower face of the carrier material.

This would, however, have the consequence that the piece of carrier material covering the layer of adhesive on the smaller label part would adhere to the adhesive laminate.

It may then be desirable for silicones or the like to be applied locally to this piece of carrier material or to the laminate itself before the reinforcing laminate is applied, thus preventing adhesion.

The invention will be explained in greater detail in connection with two embodiments and with the aid of the drawing, in which.

Figures 1, 2, 3:
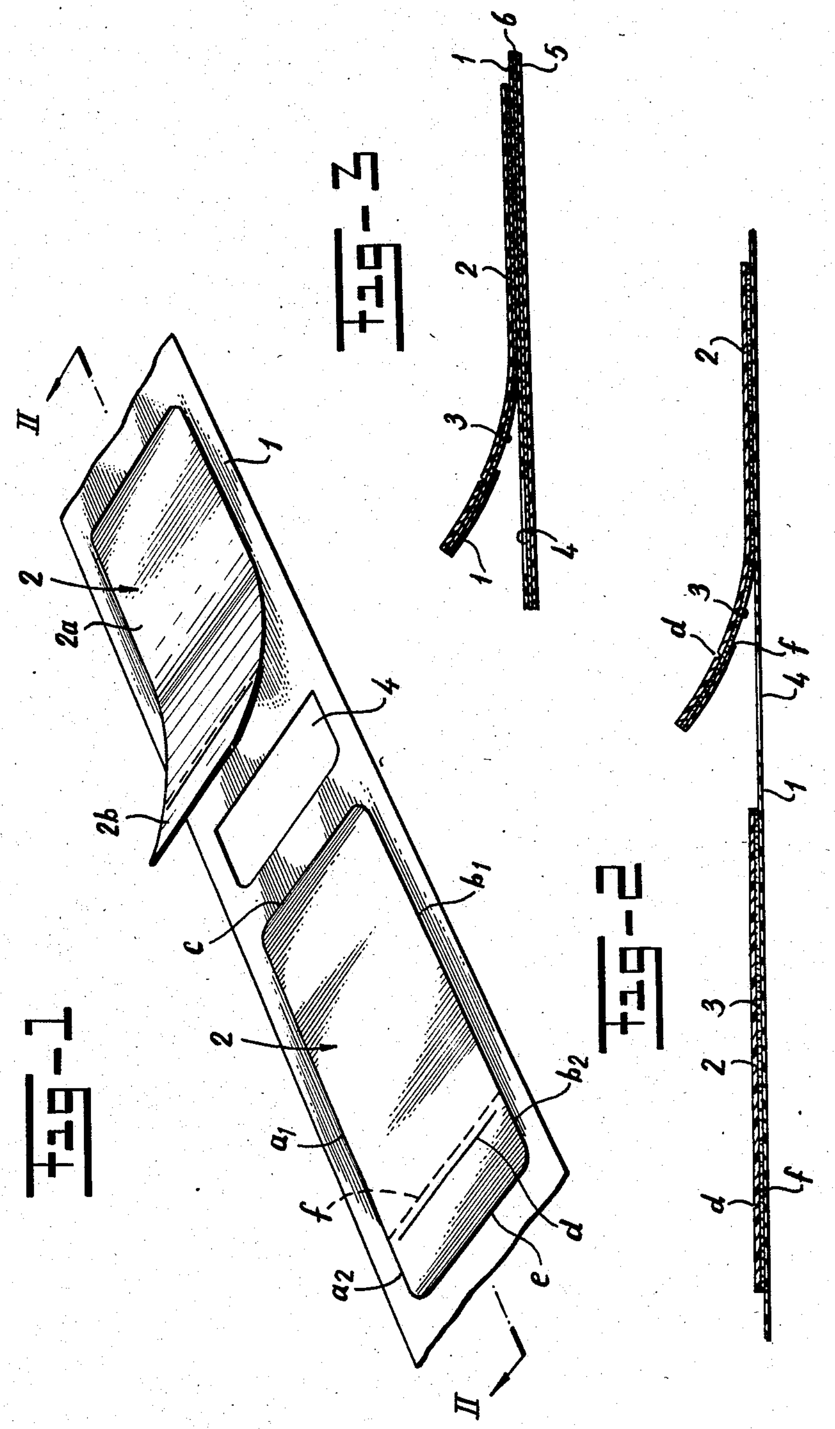
FIG. 1 is a plan view in perspective of the web of labels according to the first embodient of the invention.
FIG. 2 is a section on the line II—II in FIG. 1.
FIG. 3 is a section, corresponding to FIG. 2, of the second embodiment.

The web of labels consists in known manner of a web of carrier material 1, usually paper, wound into a roll, the surface of the material being made adhesive repellent by means of silicones or the like. On this web is stuck a web of label material 2, which usually consists of paper, with a coating 3 of pressure sensitive adhesive on the side facing the web of carrier material 1.

From a web 1, 2, 3 of this kind a number of parallel rows of labels are punched out and printed. In FIG. 2 only one row of labels is shown. In the example illustrated the labels are substantially rectangular. However, other shapes are possible.

When a web of labels is produced in the conventional manner, it consists of a strip of carrier material with, spaced apart from one another thereon, a row of for example rectangular labels, which can be removed by hand or by machine from the carrier material.

In the manufacturing process the web of carrier material and the web of label material are then passed in stages through a punching and printing machine, which prints each label and cuts it free from the remainder of the label material, which is afterwards removed as scrap from the carrier material. The cutting of the label material is thus effected through the entire thickness of that material. The carrier material remains intact.

In the case of the web of labels according to the invention the cutting takes place differently.

The longitudinal cuts $a_1$ and $b_1$ and the cross cuts c and d extend only through the material of the label 2.

The longitudinal cuts $a_2$ and $b_2$ and the cross cut e also extend through the carrier material 1.

The cross cut d does not join up with the longitudinal cuts $a_2$ and $b_2$.

This cross cut d may optionally also be in the form of perforations.

The web 1, 2, 3 is then turned over and passed through a punching machine which makes the cross cut f, which extends only through the carrier material 1.

This cross cut f therefore lies under the label 2 and is indicated by a broken line in FIG. 1. This fourth cross cut f ends at the transitions between the longitudinal cuts $a_1$, $a_2$ and $b_1$, $b_2$ respectively, and lies at a distance of about 1.5 mm from the third cross cut d.

The intermediate cuts are therefore straight cross cuts d and f in the case of a rectangular label.

Through these operations there is cut in the carrier material 1 a window 4 which is bounded by the cuts $a_2$, f, $b_2$ and e.

When the label 2 is now freed from the carrier material 1, the label 2 consists of a larger part 2*a* bounded by the cuts $a_1$, c, $b_1$ and d, and a smaller part 2*b* bounded by the cuts $a_2$, d, $b_2$ and e.

Under the smaller part 2*b* there still remains a piece of carrier material 1 bounded by the cuts $a_2$, f, $b_2$ and e.

When the label 2 is now applied to a container, the part 2*a* adheres to the container and the part 2*b* forms a slightly projecting lip, because the adhesive coating 3 on the part 2*b* is covered by a piece of carrier material 1.

The two parts are still attached to one another because the cross cut d does not extend right across or is in the form of perforations, and because a strip of carrier material 1, having a width of about 1.5 mm, adheres to the lower face of the part 2*a* between the cuts d and f.

However, the part 2*b* can easily be removed from the part 2*a*. After detachment of the piece of carrier material 1 bounded by $a_2$, f, $b_2$ and e, the part 2*b* can be affixed to a patient's card or the like. the removal of the carrier material 1 is facilitated by the projecting strip between d and f.

In this way a web of labels is formed with which the abovementioned shortcomings are avoided.

In the machine labelling of containers the windows 4 may excessively weaken the carrier web 1, so that the latter may break.

In order to prevent this, in the embodiment shown in FIG. 3, after the various longitudinal and cross cuts have been made, a laminate, such as a web 5 with an adhesive coating 6, is stuck against the lower face of the carrier material 1, whereby the windows 4 in the carrier material 1 are covered on the lower face.

This, however, has the consequence that this piece of carrier material 1 cut out of the window 4 also adheres to the adhesive coating 6, so that the removal of a label 2 would become difficult.

One solution is for the lower face of the pieces of carrier material 1 cut free from the windows 4, or the laminate itself to be provided locally, before the laminate is placed in position, with a coating of silicones or the like, which may be applied in the form of liquor or powder.

A label taken from a web of labels according the invention can also be applied without problems to sharply curved containers, because the part adhering to the container consists solely of label material. The part of the label consisting of label material and carrier material is not curved.

I claim:

1. Web of labels consisting of a web of carrier material with self-adhesive labels spaced apart thereon, each of which is cut out by a peripheral cut from a web of label material adhering to the web of carrier material, characterised in that the peripheral cut consists of two different parts, one of which extends only through the label material and the other through the label and carrier material, that an intermediate cut extending to the divisions between the two parts of the peripheral cut extends only through the carrier material, and that another intermediate cut parallel thereto extends only through the label material, in such a manner that two connected label parts are formed, while the distance between the intermediate cuts amounts to a few millimeters.

2. Web of labels according to claim 1, characterised in that the intermediate cut extending only through the label material terminates at both ends just short of the peripheral cut.

3. Web of labels according to claim 1 or 2, characterised in that the side of the carrier material facing away from the label material is provided with an adhesive laminate.

4. Web of labels according to claim 3, characterized in that a medium preventing adhesion to the adhesive laminate is interposed between the adhesive laminate and the piece of carrier material which adheres to one of the label parts.

* * * * *